(No Model.) 2 Sheets—Sheet 2.
W. C. DOUTHETT.
MEANS FOR TRANSMITTING MOTION.
No. 570,871. Patented Nov. 3, 1896.
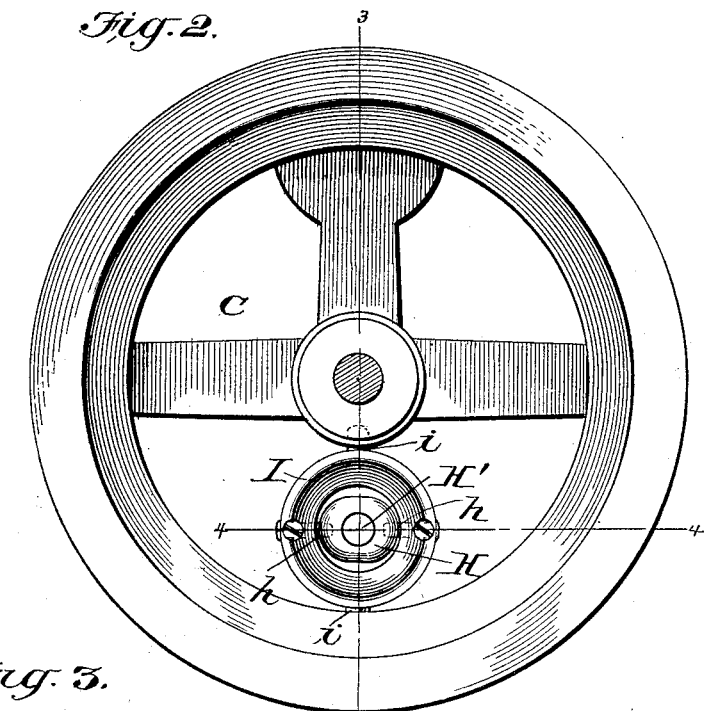
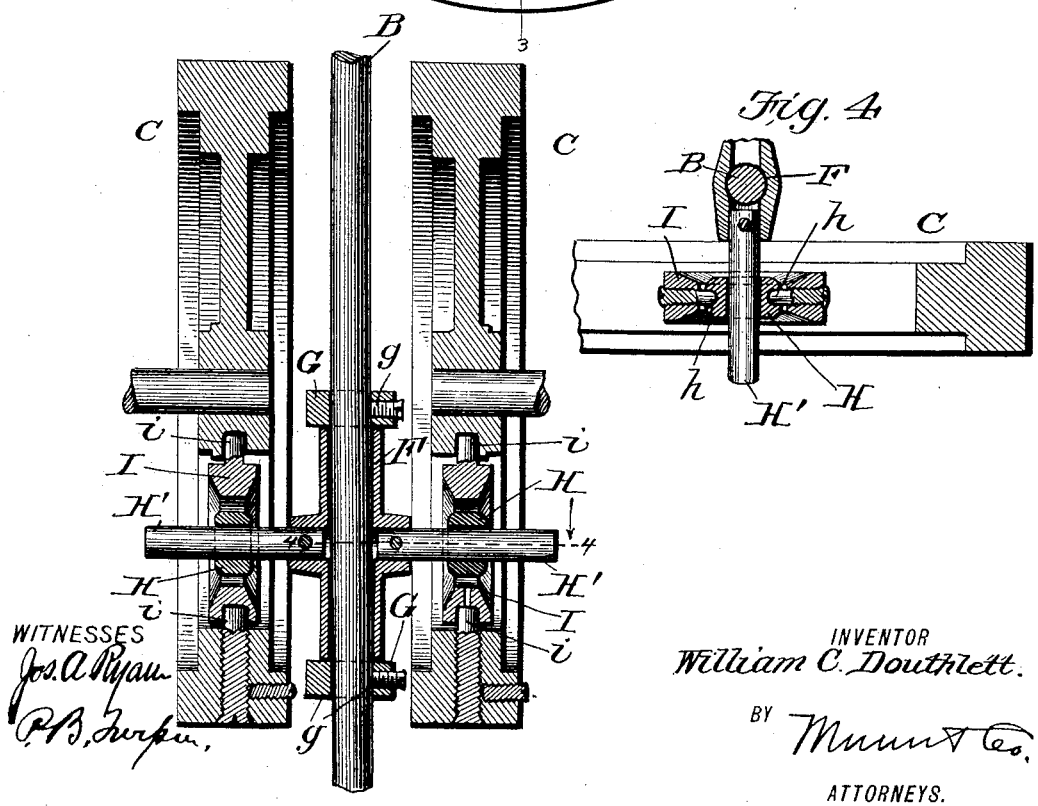
WITNESSES
Jos. A. Ryan
P. B. Turpin
INVENTOR
William C. Douthett.
BY Munn & Co.
ATTORNEYS.

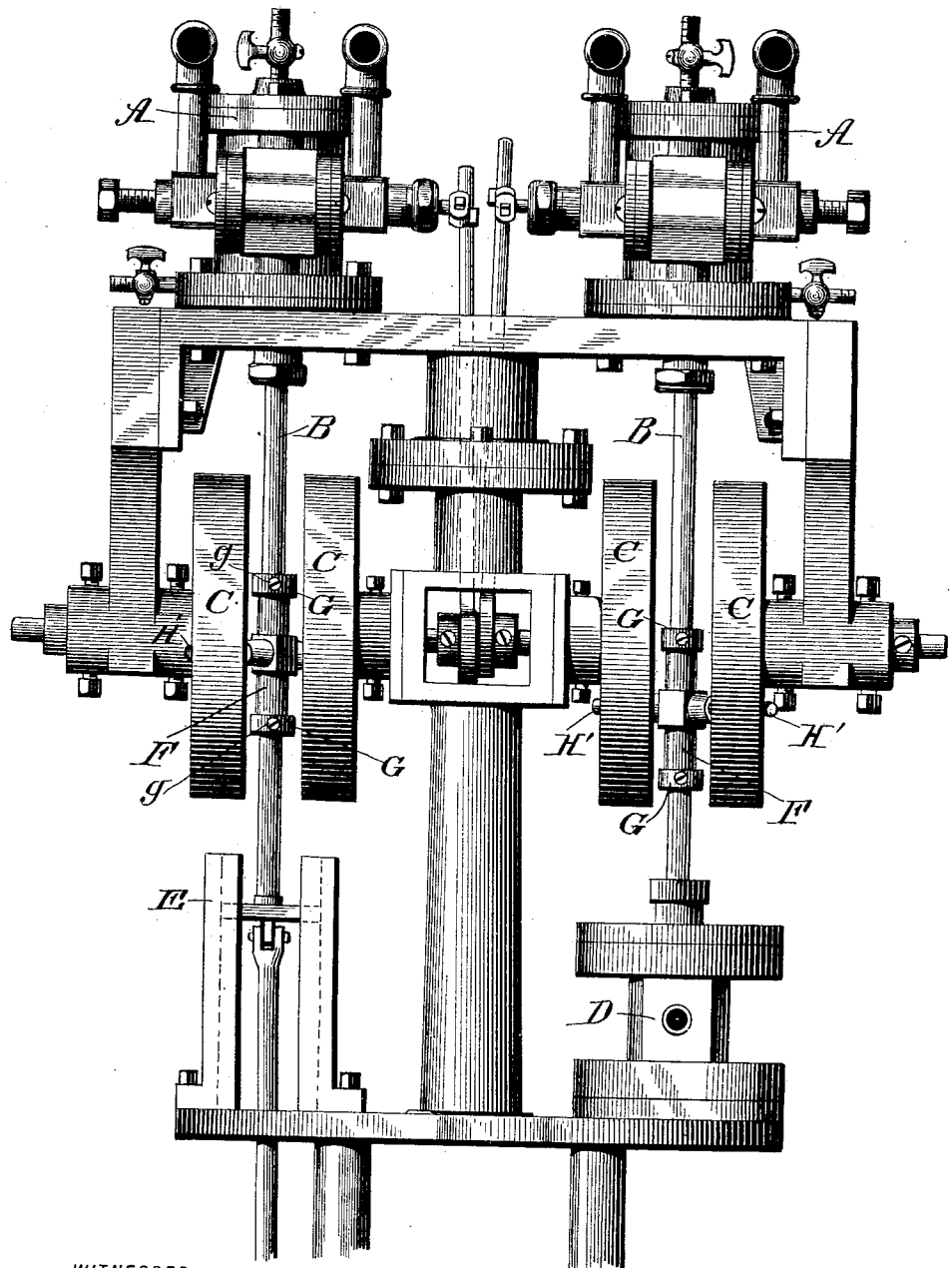

UNITED STATES PATENT OFFICE.

WILLIAM C. DOUTHETT, OF PITTSBURG, PENNSYLVANIA.

MEANS FOR TRANSMITTING MOTION.

SPECIFICATION forming part of Letters Patent No. 570,871, dated November 3, 1896.

Application filed February 15, 1896. Serial No. 579,421. (No model.)

*To all whom it may concern:*

Be it known that I, WILLIAM C. DOUTHETT, of Pittsburg, in the county of Allegheny and State of Pennsylvania, have invented certain new and useful Improvements in Means for Transmitting Motion, of which the following is a specification.

This invention is an improvement in means for transmitting motion, especially designed and adapted for use in steam-pumps; and the invention has for its objects, among others, to provide means whereby the reciprocation of the piston-rod will cause the pulley or balance-wheel to turn; also to provide two pulleys or balance-wheels and devices between the same and the piston-rod by which to turn said pulleys or wheels in opposite directions; also to provide certain improvements in the intermediate devices between the rod and pulleys or wheels, as will be more fully described.

The invention consists in certain novel constructions and combinations of parts, as will be hereinafter described, and pointed out in the claims.

In the drawings, Figure 1 is a face view of an apparatus embodying my invention. Fig. 2 is a detail side view of my improvement. Fig. 3 is a vertical section on the line 3 3, Fig. 2. Fig. 4 is a detail horizontal section on lines 4 4, Figs. 2 and 3.

In the construction shown at the left in Fig. 1 the piston-rod merely drives the wheels C C, whereas in the construction shown at the right the piston-rod, in addition to driving the wheels, also operates a pump. In both instances the steam-cylinders A, piston-rods B, pulleys or wheels C C, and the intermediate devices between the piston-rods and wheels C may be alike; but in the construction shown at the right in Fig. 1 I provide the pumping-cylinder D, which may be of any suitable form, while in the construction shown at the left in Fig. 1 the lower end of the rod is simply supported by suitable guiding devices E, as will be readily understood.

In the use of the apparatus one of the wheels C may be geared by belt with one shaft and the other with another shaft to drive such shafts in opposite directions, or both such wheels may, by twisting the belt on one, be used to drive the same shaft. The valve-gearing may be alike for both the constructions shown at the right and left in Fig. 1 and need not be specifically described herein.

In the construction shown the wheels C C are arranged on opposite sides of the piston-rod B on an axis which intersects the line of the piston-rod, so that such rod reciprocates radially of the wheels C, as shown. On this piston-rod I secure a sleeve F, which is free to turn upon the rod B, but is held from longitudinal movement along the said rod B by means of collars G G above and below the sleeve F, which collars may be detachably secured by clamping-screws *g*. This sleeve F, as will be seen, is reciprocated by the rod, and yet may turn thereon sufficiently to permit its connection with and operation of the wheels C in the manner presently described. Lateral rods H' project in opposite directions from the sleeve F and are fitted and slide in rings H, which are pivoted at *h* in rings I, which are pivoted at *i* to the wheels C. It will be noticed that the pivots *h* are arranged at right angles to the pivots *i*, the parts H and I thus constituting a universal guide for the lateral rods H'. As shown and as preferred, the line of the pivots *i* is radial to the wheel C, and in operation the reciprocation of the rod B will, by the sleeve F and the rods H', in connection with the parts H and I, operate to revolve the wheels C in opposite directions. This operation will also be secured in a smooth even manner, avoiding all jars and similar shocks to the machinery.

An especial advantage results from using the two balance-wheels, as thereby the strain upon the machine is equalized, the revolution of the wheels in opposite directions causing them to balance each other, as will be understood.

While it is preferred to use the two balance-wheels or pulleys, it should be understood that I do not desire in all the features of my invention to be limited thereto, as a single wheel may be operated from the reciprocating piston-rod by means of the devices before described with good results.

Having thus described my invention, what I claim, and desire to secure by Letters Patent, is—

1. In an apparatus substantially as described, the combination of a pulley or wheel, a reciprocating rod, a sleeve on said rod having a lateral projection, a guide-ring in which said projection is movably held, a second ring to which said first ring is pivoted and pivot connections between said second ring and the pulley or wheel, substantially as set forth.

2. In an apparatus substantially as described, the combination of the pulley or wheel, a reciprocating rod, a lateral rod or projection connected with said reciprocating rod and a universal joint carried by the pulley or wheel and having a guide-opening in which said lateral rod is held and slides substantially as set forth.

3. In an apparatus substantially as described, the combination of the pulley or wheel a reciprocating rod, a sleeve free to turn thereon, means by which said sleeve is held from longitudinal movement along the reciprocating rod, a lateral rod carried by the sleeve, a ring having an opening in which said lateral rod plays, a second ring to which said first ring is pivoted and pivot connections between said second ring, and the pulley or wheel, substantially as shown and described.

4. The combination of the pulley or wheel, a ring pivoted to said wheel, with the line of the pivots radial to said wheel, a second ring pivoted in the first ring on a line at right angles to the pivots of said ring, the reciprocating rod and a lateral rod connected with the reciprocating rod and playing within the said second ring substantially as shown and described.

5. The combination of the rod, the pulley or wheel alongside the same on an axis which intersects the line of the rod, a sleeve turning upon said rod and held from movement along the same, a lateral rod carried by said sleeve and a universal connection between said lateral rod and wheel, substantially as shown and described.

WILLIAM C. DOUTHETT.

Witnesses:
P. B. TURPIN,
SOLON C. KEMON.